(12) United States Patent
Matsumoto (10) Patent No.: US 7,946,773 B2
(45) Date of Patent: May 24, 2011

(54) IMAGING DEVICE AND OPTICAL DEVICE (75) Inventor: Tsuyoshi Matsumoto, Tokyo (JP)

(73) Assignee: Nikon Corporation, Tokyo (JP)

( * ) Notice: Subject to any disclaimer, the term of this patent is extended or adjusted under 35 U.S.C. 154(b) by 150 days.

(21) Appl. No.: 12/046,960

(22) Filed: Mar. 12, 2008

(65) Prior Publication Data

US 2008/0226285 A1 Sep. 18, 2008

(30) Foreign Application Priority Data

Mar. 12, 2007 (JP) ................................. 2007-062508

(51) Int. Cl.
*G03B 17/00* (2006.01)
*B60R 1/06* (2006.01)
(52) U.S. Cl. ........................................ 396/439; 359/507
(58) Field of Classification Search .................. 396/349, 396/439; 359/507, 508; 348/208.7
See application file for complete search history.

(56) References Cited

U.S. PATENT DOCUMENTS

| | | | | |
|---|---|---|---|---|
| 2003/0214588 A1* | 11/2003 | Takizawa et al. | ........ | 348/207.99 |
| 2003/0214599 A1* | 11/2003 | Ito et al. | ........................ | 348/335 |
| 2004/0012714 A1* | 1/2004 | Kawai | ........................... | 348/374 |
| 2004/0047625 A1 | 3/2004 | Ito et al. | | |
| 2005/0280712 A1 | 12/2005 | Kawai | | |
| 2006/0279638 A1* | 12/2006 | Matsuda et al. | ........... | 348/208.7 |
| 2007/0292126 A1* | 12/2007 | Oshima | ........................ | 396/429 |
| 2009/0153966 A1* | 6/2009 | Matsumoto | ................... | 359/508 |

FOREIGN PATENT DOCUMENTS

EP 1363154 11/2003
JP 2003-319222 11/2003

* cited by examiner

*Primary Examiner* — W. B. Perkey
*Assistant Examiner* — Noam Reisner
(74) *Attorney, Agent, or Firm* — Ditthavong Mori & Steiner, P.C.

(57) ABSTRACT

An imaging device comprising a light transmissive member 18 having light transmissive character, a vibration member 20 causing bending vibration for the light transmissive member, a driving portion 56 for driving the vibration member 20, wherein the driving portion 56 causes bending vibration of the light transmissive member 18 at a first frequency along with a first direction and causes bending vibration of the light transmissive member 18 at a second frequency along with a second direction which is different from said first frequency.

33 Claims, 5 Drawing Sheets

IMAGING DEVICE AND OPTICAL DEVICE

BACKGROUND OF THE INVENTION

1. Field of the Invention

The present invention relates to an imaging device and an optical device having beneficial effect on dust removal.

2. Description of the Related Art

In recent years, in a lens interchangeable digital camera and the like, there are problems such that dust is shown in a taken image due to accretion of the dust on a surface of a filter of an image pick-up element. In order to solve such problems, a system has been developed wherein an anti-dust member is provided between an image pick-up element and an optical system to ensure dust-prevention for the image pick-up element and filters as well as removing the attached dust on the anti-dust member by vibration (refer to JP Patent Publication No. 2003-319222).

However, according to conventional systems, since the anti-dust member is a circular shape, for covering the image pick-up element, an anti-dust member having large size is necessary which is contrary to a requirement for downsizing of the image pick-up device. Also, in the conventional systems, because a vibration mode of the anti-dust member is not considered, it has been difficult to remove the attached dust on a surface of the anti-dust member effectively.

The present invention has been made due to considering these circumstances, a purpose of the invention is to provide an image pick-up device and an optical device comprising the image pick-up device available to remove dust attached on a surface of a light transmissive anti-dust member effectively, and to maintain a portion largely and effectively available to use the anti-dust member (a portion corresponding to the image pick-up device).

SUMMARY OF THE INVENTION

In order to achieve the above purpose, an imaging device of the present invention comprises, a light transmissive member having light transmissive character, provided between an optical system and an image pick-up portion that obtains an image from the optical system, a vibration member that causes bending vibration of said light transmissive member, the vibration member being provided on the light transmissive member, and a driving portion connected electrically to said vibration member so as to drive said vibration member and cause bending of said light transmissive member at a first frequency along with a first direction, and bending of said light transmissive member at a second frequency, which is different from said first frequency, along with a second direction which crosses said first direction.

A method of making an imaging device according to the present invention comprises steps of;

providing a light transmissive member having light transmissive character between an optical system and an image pick-up portion that obtains an image from the optical system, providing a vibration member that causes bending vibration of the light transmissive member on the light transmissive member;

connecting a driving portion electrically to the vibration member so as to drive the vibration member and cause bending of the light transmissive member at a first frequency along with a first direction, and bending of the light transmissive member at a second frequency, that is different from the first frequency, along with a second direction which crosses the first direction.

An optical device according to the present invention is an optical device comprising the above mentioned imaging device which is not limited to a still camera and a video camera, and includes optical devices such as a microscope, mobile phone and the like.

DESCRIPTION OF THE PREFERRED EMBODIMENTS

Figure 1:
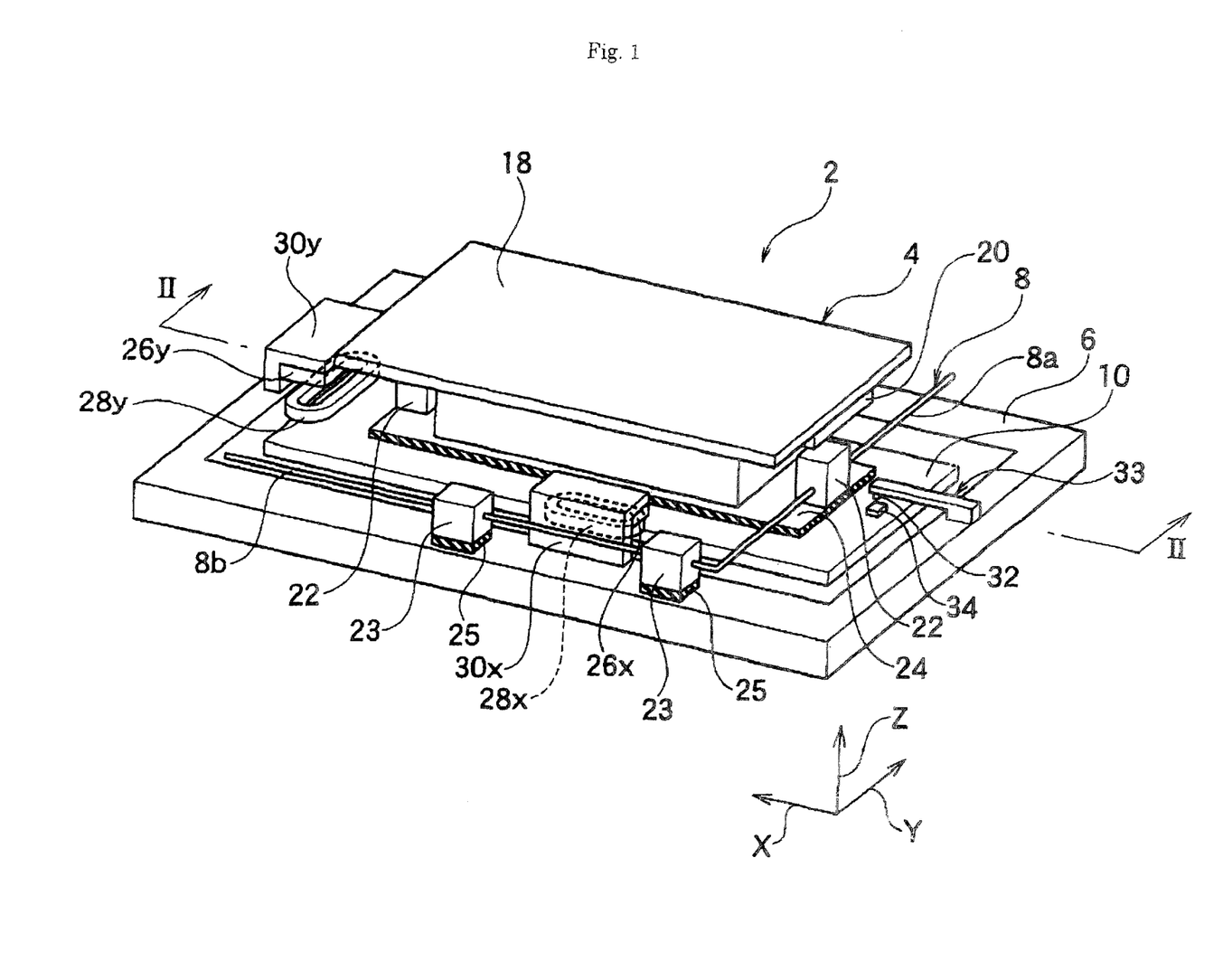
FIG. 1 is a schematic perspective view of an imaging device according to a first embodiment of the present invention
Figure 2:
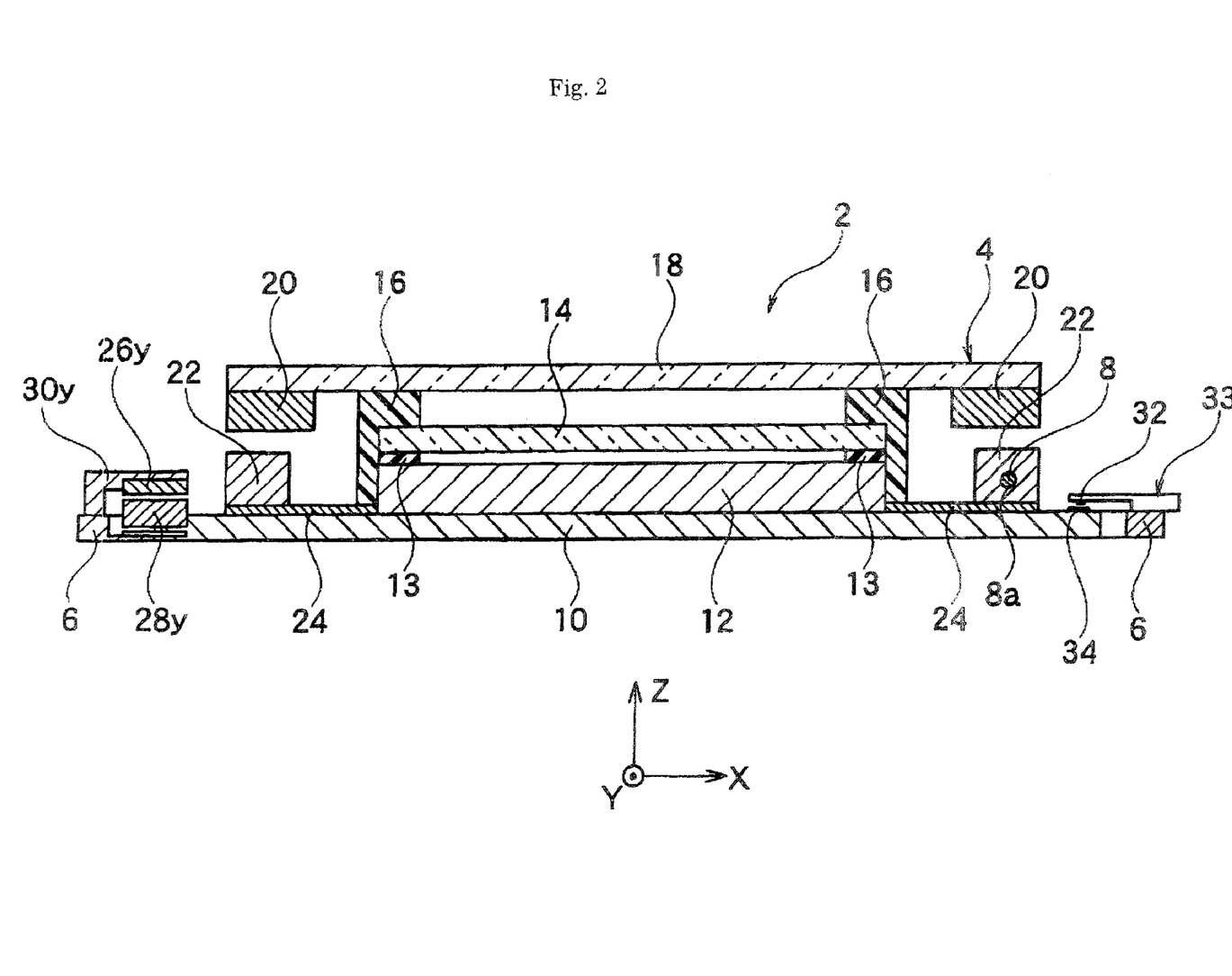
FIG. 2 is a schematic cross sectional view along a line II-II shown in FIG. 1.

As shown in FIG. 1 and FIG. 2, a motion compensation device 2 according to one embodiment of the present invention, wherein an image pick-up element 12 is provided, comprises an image pick-up unit 4 being relatively movable toward X-axis and Y-axis directions with respect to a fixed portion 6. The fixed portion 6 is fixed to a body of camera 40 shown in FIG. 3. The image pick-up unit 4 is arranged movably along with X-axis and Y-axis directions vertical to an optical axis Z direction of optical lens group 48 contained in a lens barrel 42 which is detachably attached to the body of camera 40. Note that the X-axis and Y-axis are vertical.

As shown in FIG. 1 and FIG. 2, the image pick-up unit 4 comprises a movable plate 10 which is movable to the X-axis and the Y-axis directions with respect to the fixed portion 6. The image pick-up element 12 is fixed on a surface of center portion of the movable plate 10, and an optical low-pass filter (OLPF) 14 is provided thereon via a spacer 13. The image pick-up element 12 is an element so as to convert an optical image exposed thereof into an electric signal. The optical low-pass filter (OLPF) 14 is provided for removing so-called moire effect.

A transparent glass plate 18 is arranged on the optical low-pass filter 14 via sealing members 16. By the sealing members 16, a space between the image pick-up element 12 and the optical low-pass filter 14, and a space between the optical low-pass filter 14 and the glass plate 18 are sealed. Namely, the glass plate 18 is a light transmissive antidust member which protects adhering dust on the optical low pass-filter 14 and the image pick-up element 12. In an embodiment shown in drawings, the glass plate 18 includes for example IR (infrared ray) absorbing glass, and glasses other than IR absorbing glass may be used. In the embodiment shown in drawings, the optical low-pass filter 14 comprises, for example, two crystal birefringent plates and one $\lambda/4$ plate (wavelength plates). For example, a proportion of a length along with X-direction and a length along with Y-direction of the glass plate 18 is about same as a proportion of a length along with X-direction and a length along with Y-direction of an image pick-up face of the image pick-up element 12. Thereby, the size of the glass plate 18 can be the most reduced corresponding to the image pick-up face of the image pick-up element 12.

In the present embodiment, the glass plate 18 is formed widely in X-axis direction than the optical low-pass filter 14, each end portions of the glass plate projects from the sealing member 16, and piezoelectric elements 20 as vibration members are attached on upper or lower face of the respective end portions, for example, by adhered agent and the like. The piezoelectric elements are composed, for example, by PZT (lead zirconium titanate) and the like.

On the lower side of the glass plate 18 to which the piezoelectric elements 20 are adhered, guide portions 22 are arranged, and the respective guide portions 22 are fixed to the movable plate 10 via vibration absorption sheets 24. The vibration absorption sheet 24 is a sealing member to seal between the image pick-up element 12 and the sealing member 16 to prevent the dust. Also, in order to decrease effects given by vibration of the piezoelectric element 20 to adhering a connection component of a flexible board or the image pick-up element 12 and a substrate, further, magnets of position detecting sensors and the like, the vibration absorption sheet 24 has a function to make it difficult to carry these vibrations. The vibration absorption sheet 24 is composed by an elastic member such as a rubber sheet and the like, however, adhesive agent having elastic character may be used.

A sliding hole, to which a first axis 8a of a guide rod 8 is inserted, is formed on one of a pair of the guide members 22, and the guide portion 22 is relatively movable toward Y-axis direction along with the first axis 8a. The guide rod 8 is formed as an about L-shape and comprises a second axis 8b which is vertically bended to the first axis 8a. The second axis 8b passes through insertion holes formed on the two guide portions 23, 23, by these guide portions 23, 23, it is kept relatively movable along with X-axis direction. These guide portions 23, 23 are fixed to the fixed portion 6 via vibration absorption sheets 25. Namely, in the image pick-up element unit 4, relative movements of X-axis direction and Y-axis direction to the fixed portion 6 are guided by the guide rod 8, and also rotation around z-direction (θ direction) is prevented.

The fixed portion 6 is arranged so that the image pick-up element unit 4 is surrounded by the fixed portion, a yoke 30x, which holds a permanent magnet 26x to move the image pick-up element 4 to X-axis direction on the fixed portion 6, is fixed at one side position of X-axis direction in the fixed portion 6. A coil 28x, which is fixed to the movable plate 10 in the image pick-up element unit 4, faces the permanent magnet 26x, and by electric controlling of the coil 28x, the image pick-up element unit 4 can be controlled movably to X-axis direction via the movable plate 10. Namely, the coil 28x and the permanent magnet 26x constitute a voice coil motor (VCM) as X-axis direction moving means. Note that as X-axis direction moving means, it is not limited to the VCM, and other actuators may be used.

Also, at one side position of Y-axis direction in the fixed portion 6, a yoke 30y, which holds a permanent magnet 26y to move the image pick-up element 4 to Y-axis direction on the fixed portion 6, is fixed at one side position of Y-axis direction to the fixed portion 6. A coil 28y, which is fixed to the movable plate 10 in the image pick-up element unit 4, faces the permanent magnet 26y, and by electric controlling of the coil 28y, the image pick-up element unit 4 can be controlled movably to Y-axis direction via the movable plate 10. Namely, the coil 28y and the permanent magnet 26y constitute a voice coil motor (VCM) as Y-axis direction moving means. Note that as Y-axis direction moving means, it is not limited to the VCM, and other actuators may be used.

In order to detect a relative moving position of the image pick-up element unit 4 to the fixed portion 6, a position sensor 33 is installed on the fixed portion 6. The position sensor 33 comprises a hall element 32, and a permanent magnet 34 is equipped on a surface of the movable plate 10 at a position corresponding to the hall element 32. By moving the permanent magnet 34 with the movable plate 10 to X-axis and Y-axis directions, moving amounts of the X-axis and Y-axis directions are detected by the position sensor 33. Note that the position sensor 33 as a detecting portion, is not limited to magnetic sensor, and may be PSD (Position sensitive detector) and optical sensor.

Figure 3:
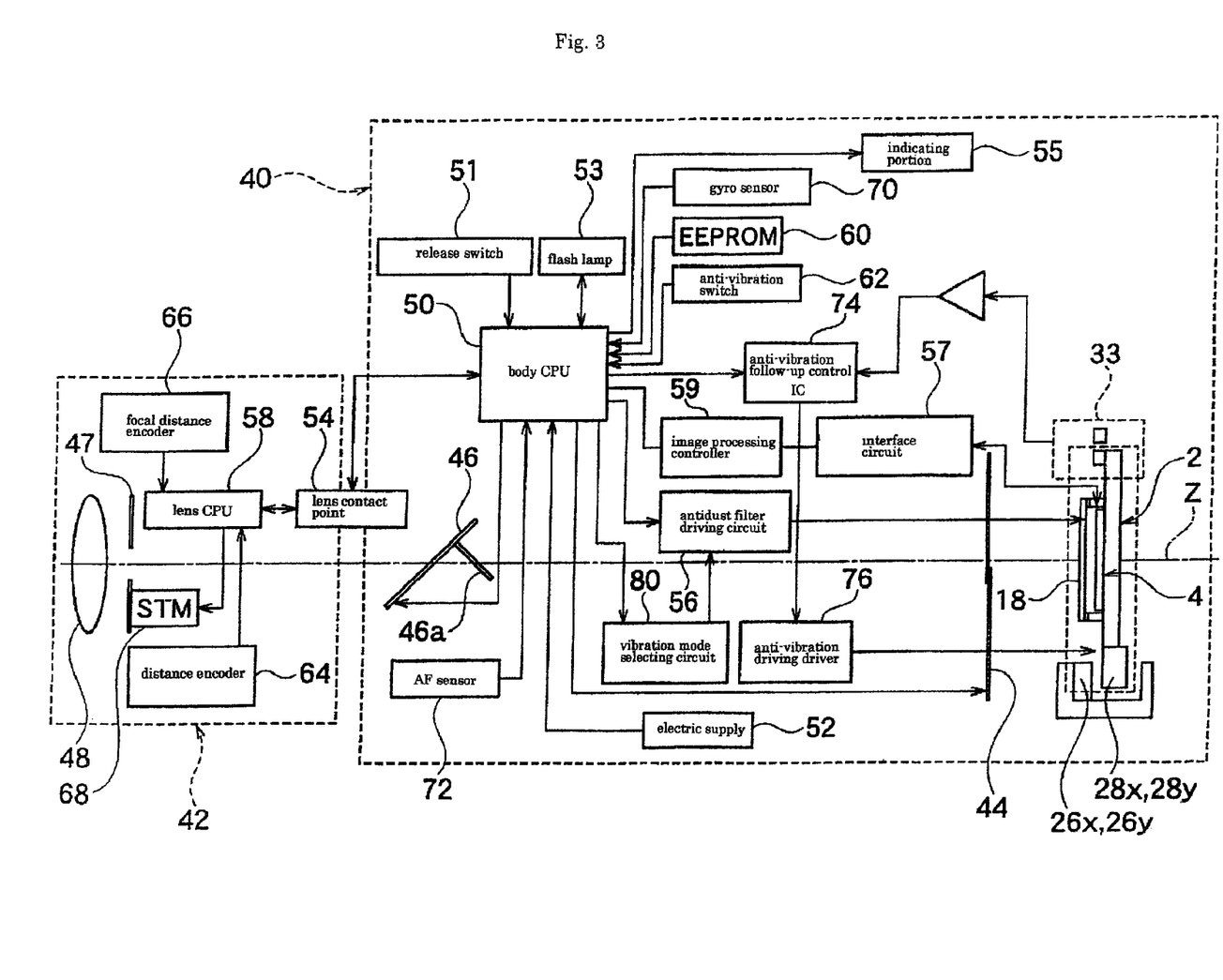
FIG. 3 is a block diagram of a whole camera.

Next, a whole camera will be specified on the basis of FIG. 3. The motion compensation device 2 having the image pick-up element unit 4 shown in FIGS. 1 to 3 is arranged in a camera body 40 so that the glass plate 18 of the image pick-up element unit 4 is being perpendicular to an optical axis Z. The glass plate 18 is parallel to the optical low-pass filter 14 and the image pick-up element 12 shown in FIG. 2.

As shown in FIG. 3, a lens barrel 42 is equipped detachably to the camera body 40. Note that in compact camera and the like, there are a camera in which the lens barrel 42 and the camera body 40 are integral, and in the present invention, types of camera are not limited particularly. Also, it can be applied to not only a still camera, but also optical devices such as a video camera, a microscope, mobile phone and the like. In following explanation, for making explanation easily, it will be explained about a single lens reflex camera in which the lens barrel 42 and the camera body 40 are detachable.

In the camera body 40, a shutter member 44 is arranged in front of Z-axis direction of the image pick-up unit 4. A mirror 46 is arranged in front of the Z-axis direction of the shutter member 44, and a diaphragm 47 and an optical lens group 48 contained within the lens barrel 42 are arranged in front of the Z-axis direction thereof.

A body CPU 50 is contained within the camera body 40 and is connected to a lens CPU 58 via a lens contact 54. The lens contact 54 causes electrically connecting the body CPU 50 and the lens CPU 58 by connecting the lens barrel 42 with the cameral body 40. A power supply 52 is connected with the body CPU 50. The power supply 52 is contained within the camera body 40.

A release switch 51, a flash lamp 53, an indicating portion 55, a gyro sensor 70, EEPROM (memory) 60, an anti-vibration switch 62, an antidust filter driving circuit 56, an image processing controller 59, AF sensor 72, an anti-vibration follow-up control IC 74 and the like are connected to the body CPU 50. The image pick-up element 12 of the image pick-up element unit 4 (refer to FIG. 3) is connected with the image controller 59 via an interface circuit 57, and the image controller 59 enables to control an image processing taken by the image pick-up element 12.

The body CPU 50 comprises a communication function with the lens barrel 42 and a control function of the camera body 40. Also, the body CPU 50 outputs an anti-vibration driving portion target point to the anti-vibration follow-up control IC 74. The anti-vibration driving portion target point is calculated from information input from EEPROM 60, a blurring angle calculated by receiving an output from the gyro sensor 70, focal distance information and distance information. Also, a blurring angle is derived by the body CPU 50 according to integrating an angular velocity of the gyro sensor 70 which inputs a sensor output through an amplifier not shown in figures to the body CPU 50.

Also, the body CPU conducts a communication whether the lens barrel 42 is equipped completely, and calculates a target position from a focal distance, distance information input from the lens CPU 58 and the gyro sensor. When a release switch 51 is pressed halfway, the body CPU outputs a command for operation of preparing to capture an image such as vibration control driving and the like in response to AE, AF and conditions to the lens CPU 58 and the vibration follow-up control IC 74. When the release switch is fully pressed, the body CPU outputs commands for mirror drive, shutter drive, diaphragm drive and the like.

The indicating portion 55 is composed of, mainly, a liquid crystal display device and the like, which displays output results, menu and the like. The release switch 51 is a switch for operating timing of shutter driving, which outputs a condition of the switch to the body CPU 50. When the release switch 51 is pressed halfway, operates AF, AE and anti-vibration driving depending on a situation. When the switch is fully pressed, it operates mirror-up, shutter drive and the like.

The mirror 46 is for showing an image to a finder at decision of picture composition, which eliminates from an optical line during exposure. Information of the release switch 51 is input from the body CPU 50, it operates mirror-up when fully pressed and mirror down after exposure is finished. The mirror 46 is driven by a mirror driving portion (for example, DC motor) which is not shown in figures. A sub-mirror 46a is connected with the mirror 46.

The sub-mirror 46a is a mirror for transmitting light to an AF sensor which introduces light beam through the mirror to the AF sensor by reflection. The sub-mirror 46a eliminates from the optical line during exposure.

A shutter member 44 is a mechanism to control an exposure time. Information of the release switch 51 is input from the body CPU 50, when the switch fully pressed, it operates shutter driving. The shutter member 44 is driven by a shutter driving portion (for example, DC motor) which is riot shown in figures.

The AF sensor 72 is a sensor for conducting Auto focusing (AF). As the AF sensor, normally, a CCD is used. An anti-vibration switch 62 outputs anti-vibration ON or OFF status to the image pick-up element unit CPU. The gyro sensor 70 detects angular velocity of blurring occurred at the body and outputs to the body CPU 50. The EEPROM 60 comprises information such as gain value and angle adjustment value of the gyro sensor and outputs to the body CPU.

The antidust filter driving circuit 56 is connected with the piezoelectric elements 20 shown in FIG. 1 and FIG. 2, and when predetermined conditions are satisfied, the circuit drives the piezoelectric elements 20 for vibrating the glass plate 18 to act an operation for removing dust and the like adhered on the surface of the glass plate 18, as shown in FIG. 4B, FIG. 4C or FIG. 5B and FIG. 5C.

For example, to the piezoelectric elements 20, electric voltage such as periodic rectangular wave or sine wave and the like are applied. In this manner, according to applying periodic electric voltage to the piezoelectric elements 20 by controlling the antidust driving circuit 56, the glass plate 18 is vibrated. When an inertia force received from the glass face exceeds an adherence of the dust, the dust comes off from the glass face.

Preferably, as for the periodic driving of the piezoelectric elements 20, it is preferable to drive the piezoelectric elements 20 with a vibration frequency so as to resonate a surface of the glass plate 18, in order to obtain preferably large amplitude by low voltage.
A resonate frequency is determined by a shape, material, manner of support and vibration mode. It is preferable to support the glass plate 18 at a node position at which amplitude becomes 0.

In the present embodiment, a vibration mode selecting circuit 80 is connected with the antidust filter driving circuit 56. The vibration mode selecting circuit 80 controls the antidust filter driving circuit 56 via the body CPU 50. Details of control by the vibration mode selecting circuit 80 will be mentioned below.

The vibration follow-up control IC 74 is IC for vibration control. The IC calculates an anti-vibration driving portion moving amount from an anti-vibration driving portion target point input from the body CPU 50 and an anti-vibration driving portion position information input from a position detecting portion, and outputs the moving amount to an anti-vibration driver 76. Namely, a position signal of the image pick-up element unit from the position sensor 33 and an output signal from the body CPU 50 are input to the anti-vibration follow-up control IC 74. In the body CPU 50, the anti-vibration driving portion target position is calculated from an angle of blurring calculated by receiving an output of the gyro sensor 70, a focal distance information detected by a focal distance encoder, a distance information detected by a distance encoder 64 and the like, and the anti-vibration driving portion target position is output to the anti-vibration follow-up control IC 74.

The anti-vibration driver 76 is a driver for controlling an anti-vibration driving portion to control a driving direction and a driving amount of the anti-vibration driving portion by receiving an amount of driving from the anti-vibration follow-up control IC. Namely, the anti-vibration driver 76 sends driving current to the coils 28x and 28y based on the input information from the anti-vibration follow-up control IC 74, and causes to move the image pick-up element unit 4 to X-axis and Y-axis directions against the fixed portion 6, and thereby a motion compensation control is made.

In the lens barrel 42 as shown in FIG. 3, the focal distance encoder 66, a distance encoder 64, a diaphragm portion 47, a driving motor 68 for controlling a diaphragm portion 47, the lens CPU 58, a lens contact point 54 with a body portion and a plurality of lens group 48 are equipped. In the lens contact 54, there are a contact point for supplying a lens driving system power from the camera body 40, a contact point of a CPU power supply for driving the lens CPU 58 and a contact point for digital communication.

The driving system power supply and the CPU power supply are supplied from the power supply 52 of the camera body 40 to provide electric power for the lens CPU 58 and the driving system. The digital communication contact point conducts communication to input digital information output from the lens CPU 58, such as a focal distance, a subject distance and a focal position information and the like to the body CPU 50, and conducts communication to input digital information output from the body CPU 50, such as a focal position information and a diaphragm amount and the like to the lens CPU 58. The lens CPU 58 operates to control AF and diaphragm by receiving the focal position information and the diaphragm amount information from the body CPU 50.

The focal distance encoder 66 determines the focal distance from position information of a zooming lens group. Namely, the focal distance encoder 66 encodes the focal distance and outputs it to the lens CPU.

The distance encoder 64 determines the subject distance from position information of a focusing lens group. Namely, the distance encoder 64 encodes the subject distance and outputs it to the lens CPU.

The lens CPU comprises a communication function with the camera body 40 and a controlling function for the lens group 48. The focal distance and the subject distance and the like are input to the lens CPU, which are output to the body CPU 50 via the lens contact 54. Release information and AF information are input from the body CPU 50 to the lens CPU 58, via a lens contact 54.

Figure 4A:
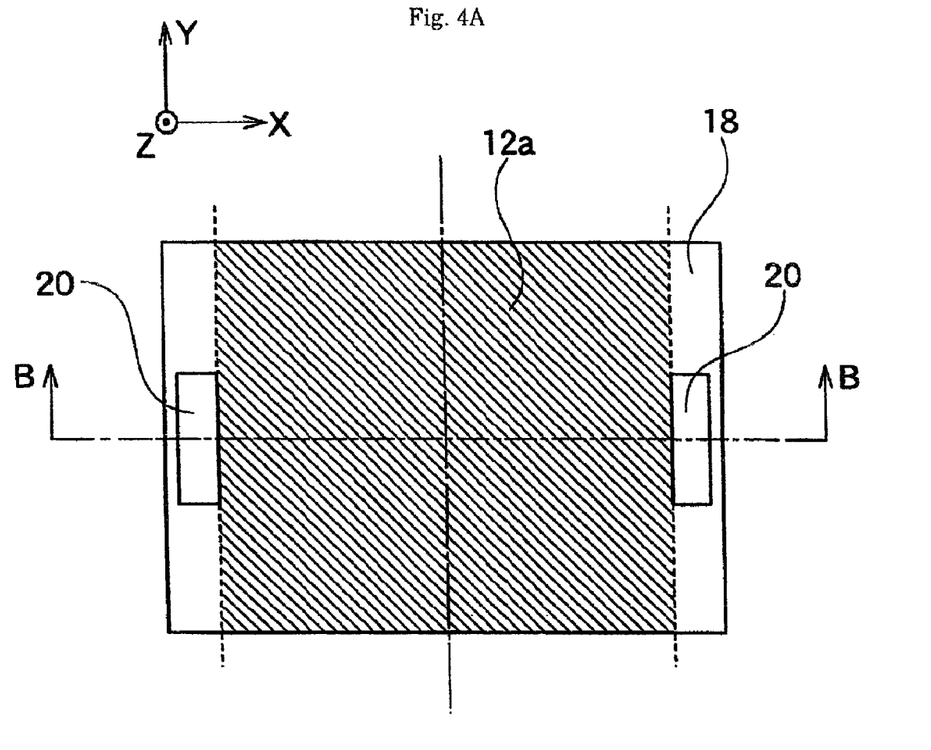
FIG. 4A is a plane view of a light transmissive member shown in FIG. 1.
Figure 4B:
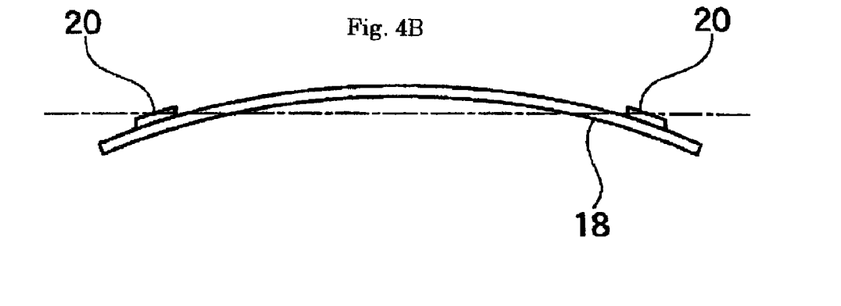
FIG. 4B and FIG. 4C are cross sectional views of principal part along a line B-B of FIG. 4A.
Figure 4C:
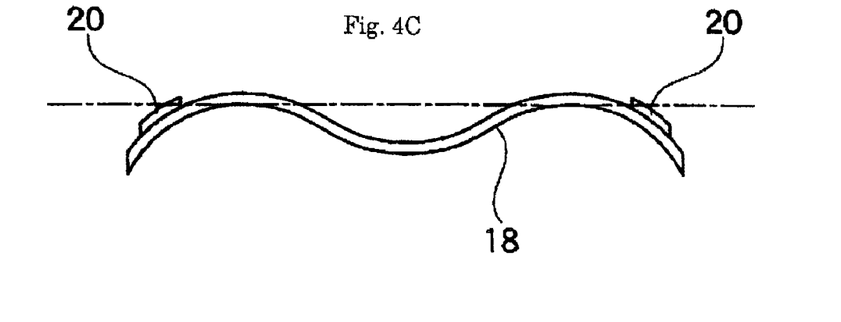
Figure 5A:
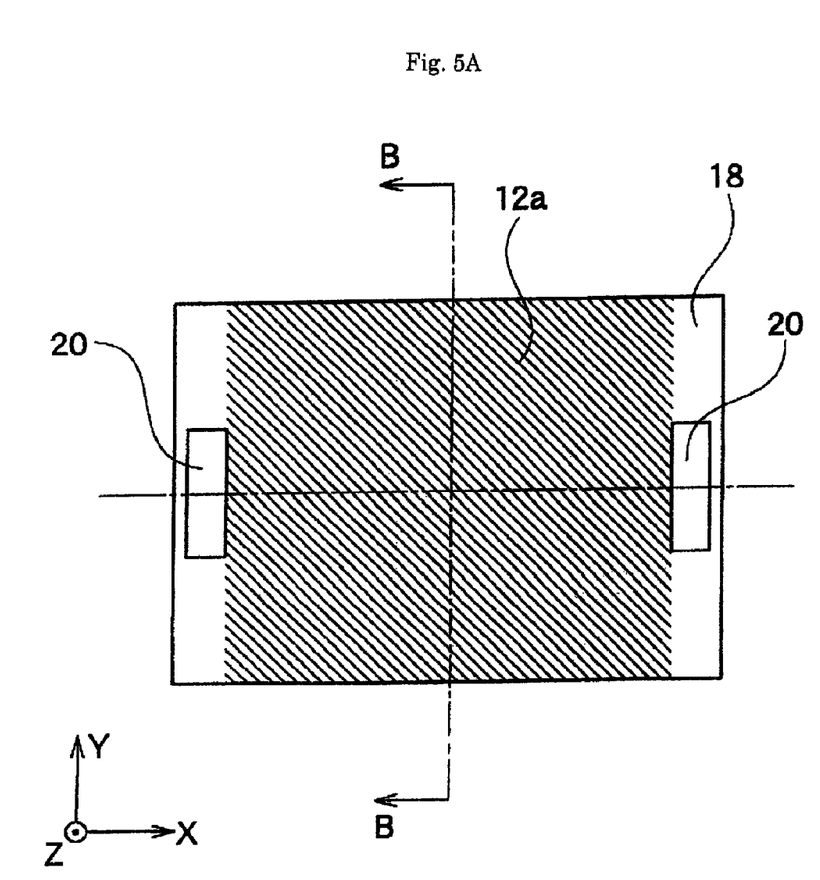
FIG. 5A is a plane view of a light transmissive member shown in FIG. 1.
Figure 5B:
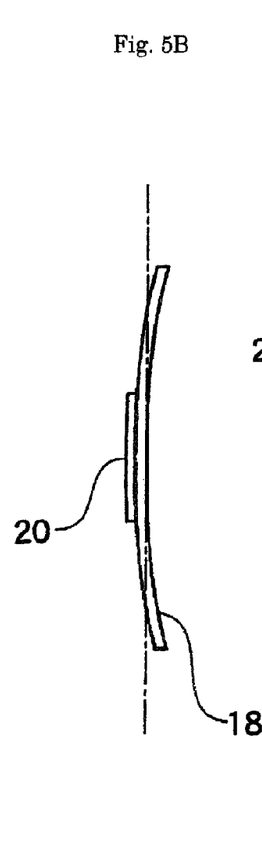
FIG. 5B and FIG. 5C are cross sectional views of principal part along a line B-B of FIG. 5A.
Figure 5C:
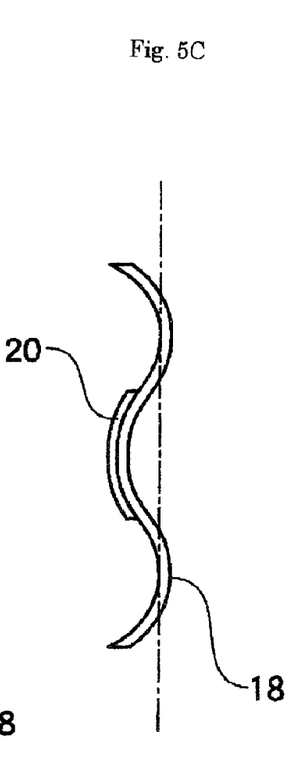

Next, a vibration mode of the glass plate 18 by the piezoelectric elements 20 on the basis of mainly FIG. 3 to FIG. 5.

In the present embodiment, a signal is transmitted from the vibration mode selecting circuit 80 shown in FIG. 3 to the antidust filter driving circuit 56, for example as shown in FIG. 4B, to vibrate the glass plate 18 at a first vibration mode along with the X-axis direction. In the case of the glass plate's 18 dimension is 20 mm wide, 28 mm high and 0.4 mm thick, and the piezoelectric element's 20 dimension is 4 mm wide, 12 mm high and 0.5 mm thick, a vibration frequency of the first vibration mode shown in FIG. 4B is, for example, about 1260 Hz. Although FIG. 4B shows a condition that the glass plate 18 is upwardly convex, in fact, the plates vibrate by alternately repeating upwardly convex and downwardly convex.

A vibration frequency of a second vibration mode (not shown) along with the X-axis direction (a longitudinal direction) of the glass plate 18 is, for example, about 3790 Hz, and a vibration frequency of a third vibration mode shown in FIG. 4C is, for example, about 7689 Hz. Also, as shown in FIG. 5B, a vibration frequency of a first vibration mode along with the Y-axis direction (a lateral direction) is, for example, about 3700 Hz, and a vibration frequency of a third vibration mode shown in FIG. 5C is, for example, about 16500 Hz.

Although these vibration modes are realized by driving a pair of piezoelectric elements 20 arranged at center portion of both ends of the X-axis direction at the glass plate 18 under predetermined frequency, in some cases, each piezoelectric element 20 may be arranged at all sides of the glass plate 18, respectively.

However, as in the present embodiment, by arranging piezoelectric elements 20 at center position of both ends of the X-axis direction in the glass plate 18, a portion to be used effectively (a portion where the image pick-up element is arranged) can be made large without increasing size of the glass plate 18. Also, in the present invention, a plurality of vibration modes may be realized by arranging a piezoelectric element 20 at only one position of the all sides of the glass plate 18.

In the present embodiment, vibration modes to be occurred on the glass plate 18 shown in FIG. 4 and FIG. 5 by controlling the antidust driving circuit 56 on the basis of the vibration mode selecting circuit 80 shown in FIG. 3 is preferably switchable to a plurality of vibration modes by considering an occurred velocity (dust removing force) and a node position. Note that, the dust removal tends to be insufficient at a position of node of the vibration in the glass plate 18 due to not vibrating. Therefore, by changing a vibration mode of the piezoelectric element 20 according to changing a driving vibration frequency so as to change a node position of vibration of the glass plate, it will be possible to remove dust at whole area of the glass plate 18.

For example, as shown in FIG. 4B, in case that sufficient dust removal effect cannot be obtained by the first bending vibration mode along with the X-axis direction only, following control will be operated. Namely, a control signal is transmitted from the vibration mode selecting circuit 80 shown in FIG. 3 to the antidust filter driving circuit 56, and the driving frequency of the piezoelectric element 20 is set higher as shown in FIG. 4C, in order to vibrate the glass plate 18 under a third bending vibration mode. In this case, further dust removal effect can be obtained.

Further, a control single is transmitted from the vibration mode selecting circuit 80 shown in FIG. 3 to the antidust filter driving circuit 56, and the glass plate 18 may be vibrated under the first to the third bending vibration modes along with the Y-axis direction, as shown in FIG. 5B and FIG. 5C. Further, it is possible to use a combination of a higher level bending vibration mode at the both X-axis and Y-axis directions. Furthermore, it is possible to control by different bending vibration modes repeatedly, which can increase dust removal effect. Also, for example, by suitably changing the vibration modes of the X-axis and the Y-axis, dust on the glass face may be moved from a center portion of the glass face to an end portion thereof.

On the other hand, according to a limitation such as cost for driving circuit and the like, in case that the above wide scope driving frequency (1260 to 16500 Hz) cannot be used, a second bending vibration mode (3790 Hz) along with the X-axis direction and the first bending vibration mode (about 3700 Hz) along with the Y-axis direction may be used. In this case, since the vibration modes can be changed by small frequency changing, a necessary frequency scope becomes smaller, and it is possible to compose driving circuits easily with low cost.

Also, in the present embodiment, by adjusting the driving frequency applied to the piezoelectric element 20, a favorable excitation in conformity with an aspect ratio of a rectangular glass plate 18 becomes available. Also, by adjusting a timing of the bending vibration along with the X-axis direction and the bending vibration along with the Y-axis direction appropriately, a favorable excitation in conformity with an aspect ratio of the rectangular glass plate 18 becomes available.

Further, in the present embodiment, by differing "timing" and/or "frequency" of the bending vibration along with the X-axis direction and the bending vibration along with the Y-axis direction, it will be hard to interfere with the vibration of the X-axis direction and the vibration of the Y-axis direction.

Furthermore, in the present invention, by causing bending vibration of a transmissive member under a plurality of vibration modes along with at least one of the X-axis direction and the Y-axis direction, a node position of vibration and a loop position of vibration are replaced, and a position not vibrating constantly (a node position constantly) is decreased. For this reason, dust adhering area becomes decreased. Note that, in the above mentioned embodiment, although the explanation has been made by using an imaging device which operates blurring compensation by moving the image pick-up element, it is not limited to this. For example, it may be either an imaging device which operates blurring compensation by moving lens or an imaging device which has no blurring compensation function.

Note that the present invention is not limited to the above explained embodiment and can be modified within a scope of the present invention.

For example, as a light transmissive member having antidust character is not limited to the glass plate 18, other light transmissive member such as lens, filters and the like may be used. Also, as a vibration member, vibration member other than piezoelectric elements may be used.

The invention claimed is:

1. An imaging device comprising;
    a light transmissive member having light transmissive character, provided between an optical system and an image pick-up portion that obtains an image from the optical system, the light transmissive member having a pair of first sides and a pair of second sides which are perpendicular to the first sides,
    a vibration member that causes bending vibration having a vibration node of said light transmissive member, the vibration member being provided on the light transmissive member, and
    a driving portion connected electrically to said vibration member so as to drive said vibration member and cause bending vibration having the vibration node of said light transmissive member along a first direction which is parallel to the first sides of the light transmissive member to cause bending vibration at a first frequency and cause bending vibration having the vibration node of said light transmissive member at along a second direction which is parallel to the second sides of the light transmissive member, and which crosses said first direction, to cause bending vibration at a second frequency which is different from said first frequency, wherein said driving portion causes bending vibration of said light transmissive member along said second direction at a different timing of the bending vibration of said light transmissive member along said first direction.

2. The imaging device as set forth in claim 1, wherein; said light transmissive member is a rectangular shape in which a pair of long sides of the rectangular shape is the pair of first sides and a pair of short sides of the rectangular shape is the pair of second sides.

3. The imaging device as set forth in claim 1, wherein; said light transmissive member comprises a plane surface that faces said image pick-up portion;
said first direction and said second direction are parallel to said plane surface.

4. The imaging device as set forth in claim 1, wherein; said driving portion individually controls the bending vibration of said first frequency and the bending vibration of said second frequency.

5. The imaging device as set forth in claim 1, wherein; said driving portion operates the bending vibration of said first frequency and the bending vibration of said second frequency at a different timing.

6. The imaging device as set forth in claim 1, wherein; said driving portion causes bending vibration of said light transmissive member at a plurality of vibration modes with respect to at least one of said first direction and said second direction.

7. The imaging device as set forth in claim 6, wherein; a resonance frequency of at least one of the plurality of vibration modes of said first direction and said second direction includes a resonance frequency of the other vibration mode of said first direction and said second direction.

8. The imaging device as set forth in claim 1, wherein; said vibration member is provided at both end portions along said first direction.

9. The imaging device as set forth in claim 1, wherein; said vibration member is provided at a center portion along said second direction.

10. The imaging device as set forth in claim 1, wherein; a bending vibration along said first direction and a bending vibration along said second direction are odd-order vibration modes.

11. An imaging device comprising;
a light transmissive member having light transmissive character, provided between an optical system and an image pick-up portion that obtains an image from the optical system, the light transmissive member having a pair of first sides and a pair of second sides which are perpendicular to the first sides,
a vibration member that causes bending vibration having a vibration node of said light transmissive member, and
a driving portion that drives said vibration member, wherein;
said driving portion causes bending vibration having the vibration node of said light transmissive member along a first direction which is parallel to the first sides of the light transmissive member and causes bending vibration having the vibration node of said light transmissive member along a second direction which is parallel to the second sides of the light transmissive member, and which crosses said first direction at a different timing from the bending vibration along said first direction.

12. The imaging device as set forth in claim 11, wherein;
said driving portion causes bending vibration of said light transmissive member at a first frequency along said first direction; and
said driving portion causes bending vibration of said light transmissive member at a second frequency, which is different from said first frequency, along with said second direction.

13. An imaging device comprising;
a light transmissive member having light transmissive character, provided between an optical system and an image pick-up portion that obtains an image from the optical system, the light transmissive member having a pair of first sides and a pair of second sides which are perpendicular to the first sides,
a vibration member that causes bending vibration having a vibration node of said light transmissive member, and
a driving portion so as to drive said vibration member and cause bending vibration having the vibration node of said light transmissive member along a first direction which is parallel to the first sides of the light transmissive member and cause bending vibration having the vibration node of said light transmissive member along a second direction which is parallel to the second sides of the light transmissive member, and which crosses said first direction,
wherein said driving portion causes bending vibration of said light transmissive member along said second direction at a different timing of the bending vibration of said light transmissive member along said first direction.

14. The imaging device as set forth in claim 13, wherein;
said driving portion causes bending vibration of said light transmissive member at a first frequency along said first direction and causes bending vibration of said light transmissive member at a second frequency, which is different from said first frequency, along said second direction.

15. An optical device comprising the image device as set forth in claim 1.

16. A method of making an imaging device comprising the steps of;
providing a light transmissive member having light transmissive character between an optical system and an image pick-up portion that obtains an image from the optical system, the light transmissive member having a pair of first sides and a pair of second sides which are perpendicular to the first sides;
providing a vibration member that causes bending vibration having a vibration node of the light transmissive member on the light transmissive member, the vibration member being adhered to the light transmissive member; and
connecting a driving portion electrically to the vibration member so as to drive the vibration member and cause bending vibration having the vibration node of the light transmissive member along a first direction which is parallel to the first sides of the light transmissive member to cause bending vibration at a first frequency and cause bending vibration having the vibration node of the light transmissive member along a second direction which is parallel to the second sides of the light transmissive member, and which crosses the first direction, to cause bending vibration at a second frequency that is different from the first frequency, wherein said driving portion causes bending vibration of said light transmissive member along said second direction at a different timing of the bending vibration of said light transmissive member along said first direction.

17. The method of claim 16, wherein the driving portion individually controls the bending vibration of the first frequency and the bending vibration of the second frequency.

18. The method of claim 16, wherein;

the driving portion operates the bending vibration of the first frequency and the bending vibration of the second frequency at a different timing.

19. The imaging device as set forth in claim 1, wherein the vibration member is adhered to the light transmissive member.

20. The imaging device as set forth in claim 1, wherein said light transmissive member is a rectangular shape in which a pair of long sides of the rectangular shape is the pair of first sides and a pair of short sides of the rectangular shape is the pair of second sides, the imaging device has two vibration members, and each of the vibration members is provided at an opposite end of the light transmissive member along the first direction which is parallel to the first sides.

21. The imaging device as set forth in claim 1, wherein the number of the vibration node along the first direction and the number of vibration node along the second direction are different.

22. The imaging device as set forth in claim 11, wherein the vibration member is adhered to the light transmissive member.

23. The imaging device as set forth in claim 11, wherein said light transmissive member is a rectangular shape in which a pair of long sides of the rectangular shape is the pair of first sides and a pair of short sides of the rectangular shape is the pair of second sides, the imaging device has two vibration members, and each of the vibration members is provided at an opposite end of the light transmissive member along the first direction which is parallel to the first sides.

24. The imaging device as set forth in claim 11, wherein the number of the vibration node along the first direction and the number of vibration node along the second direction are different.

25. The imaging device as set forth in claim 13, wherein the vibration member is adhered to the light transmissive member.

26. The imaging device as set forth in claim 13, wherein said light transmissive member is a rectangular shape in which a pair of long sides of the rectangular shape is the pair of first sides and a pair of short sides of the rectangular shape is the pair of second sides, the imaging device has two vibration members, and each of the vibration members is provided at an opposite end of the light transmissive member along the first direction which is parallel to the first sides.

27. The imaging device as set forth in claim 13, wherein the number of the vibration node along the first direction and the number of vibration node along the second direction are different.

28. The method of claim 16, wherein said light transmissive member is a rectangular shape in which a pair of long sides of the rectangular shape is the pair of first sides and a pair of short sides of the rectangular shape is the pair of second sides, two vibration members are provided, and each of the vibration members is provided at an opposite end of the light transmissive member along the first direction which is parallel to the first sides.

29. The method of claim 16, wherein the number of the vibration node along the first direction and the number of vibration node along the second direction are different.

30. The imaging device as set forth in claim 1, wherein a cross section of said light transmissive member along the first direction is different from that along the second direction at a same timing when the light transmissive member is in the bending vibration.

31. The imaging device as set forth in claim 11, wherein a cross section of said light transmissive member along the first direction is different from that along the second direction at a same timing when the light transmissive member is in the bending vibration.

32. The imaging device as set forth in claim 13, wherein a cross section of said light transmissive member along the first direction is different from that along the second direction at a same timing when the light transmissive member is in the bending vibration.

33. The method of claim 16, wherein a cross section of said light transmissive member along the first direction is different from that along the second direction at a same timing when the light transmissive member is in the bending vibration.

\* \* \* \* \*